US012675558B2

(12) United States Patent　　　　　(10) Patent No.:　US 12,675,558 B2
Brock et al.　　　　　　　　　　　　　(45) Date of Patent:　　Jul. 7, 2026

---

(54) METHOD AND SYSTEM FOR DECOMMISSIONING CLOUD-CONNECTED PRINTERS

(71) Applicant: ZEBRA TECHNOLOGIES CORPORATION, Lincolnshire, IL (US)

(72) Inventors: Ryan E. Brock, Cary, IL (US); Chris Kenley, Gurnee, IL (US); Andrew J. Pekarske, Mundelein, IL (US); Alok Gaur, Germantown, MD (US); Daniel V. Carroll, Port Barrington, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 167 days.

(21) Appl. No.: 18/118,222

(22) Filed: Mar. 7, 2023

(65) Prior Publication Data

US 2024/0303303 A1　　Sep. 12, 2024

(51) Int. Cl.
| | |
|---|---|
| *G06F 21/31* | (2013.01) |
| *G06F 3/12* | (2006.01) |
| *G06F 21/60* | (2013.01) |
| *G06F 21/62* | (2013.01) |
| *G06F 21/10* | (2013.01) |
| *H04L 49/00* | (2022.01) |

(52) U.S. Cl.
CPC ........... *G06F 21/31* (2013.01); *G06F 21/608* (2013.01); *G06F 3/1236* (2013.01); *G06F 21/1063* (2023.08); *G06F 21/1077* (2023.08);

*G06F 21/1082* (2023.08); *G06F 21/62* (2013.01); *G06F 2221/2137* (2013.01); *H04L 49/3018* (2013.01)

(58) Field of Classification Search
CPC ........... G06F 3/12; G06F 21/31; G06F 3/1236
See application file for complete search history.

(56) References Cited

U.S. PATENT DOCUMENTS

| | | | |
|---|---|---|---|
| 11,336,466 B1 | 5/2022 | Pekarske et al. | |
| 2004/0114265 A1* | 6/2004 | Talbert | G06F 3/0676 360/60 |
| 2007/0255827 A1* | 11/2007 | Aull | H04L 63/16 709/225 |
| 2008/0151298 A1 | 6/2008 | Kurotsu | |
| 2008/0151304 A1* | 6/2008 | Matsugashita | G06F 3/1207 358/1.18 |
| 2009/0033990 A1 | 2/2009 | Matsugashita | |

(Continued)

OTHER PUBLICATIONS

International Search Report and Written Opinion for International Application No. PCT/US2024/15162 mailed on May 22, 2024.

*Primary Examiner* — William R Korzuch
*Assistant Examiner* — Aditya Sriram

(57) ABSTRACT

A method in a server includes: receiving, from a client computing device associated with an account identifier, an account deletion request corresponding to the account identifier; retrieving, from a repository, an identifier of a printer associated with the account identifier; transmitting a decommissioning command to the printer, the decommissioning command configuring the printer to delete data associated with the account identifier from a local storage of the printer; and deleting, from the repository, the account identifier and account data associated with the account identifier.

20 Claims, 6 Drawing Sheets

(56)          References Cited

U.S. PATENT DOCUMENTS

| | | | |
|---|---|---|---|
| 2013/0067460 A1 | 3/2013 | Shapiro | |
| 2013/0194612 A1 | 8/2013 | Nishida | |
| 2016/0350041 A1* | 12/2016 | Katano | H04L 67/025 |
| 2017/0171321 A1* | 6/2017 | Gao | H04W 12/068 |
| 2017/0262157 A1* | 9/2017 | Shem Tov | G06F 3/0488 |
| 2019/0095289 A1* | 3/2019 | Kumar | G06F 11/1451 |
| 2019/0354922 A1 | 11/2019 | Berti et al. | |
| 2020/0053166 A1* | 2/2020 | Gordon | G06N 5/01 |
| 2021/0124535 A1* | 4/2021 | Nakajima | G06Q 20/405 |
| 2021/0185047 A1* | 6/2021 | Kim | H04L 63/0876 |
| 2022/0075582 A1* | 3/2022 | Kitahara | H04L 51/04 |

* cited by examiner

METHOD AND SYSTEM FOR DECOMMISSIONING CLOUD-CONNECTED PRINTERS

BACKGROUND

A device such as a printer can be controlled from a mobile computing device (e.g., a smartphone or the like, distinct from the printer), for example via a network-accessible server. The mobile device can, for example, be associated with an account maintained at the server. Systems implementing such server-mediated control of a printer may not permit changes to associations between mobile computing devices and printers, however.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
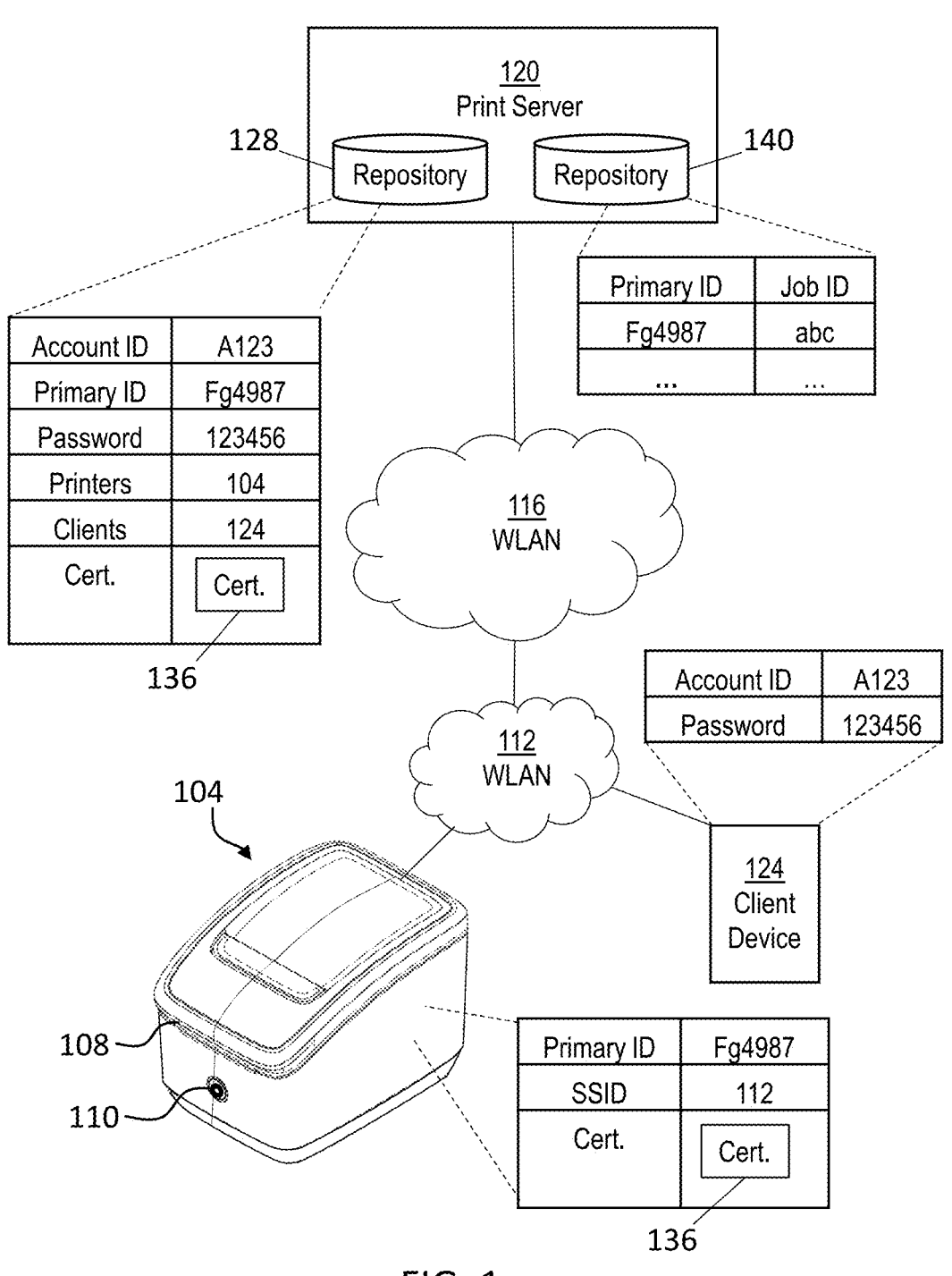
FIG. 1 is a diagram of a system for decommissioning printers.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a server, the method comprising: receiving, from a client computing device associated with an account identifier, an account deletion request corresponding to the account identifier; retrieving, from a repository, an identifier of a printer associated with the account identifier; transmitting a decommissioning command to the printer, the decommissioning command configuring the printer to delete data associated with the account identifier from a local storage of the printer; and deleting, from the repository, the account identifier and account data associated with the account identifier.

Additional examples disclosed herein are directed to a server, comprising: a memory storing a repository; a communications interface; and a processor configured to: receive, from a client computing device associated with an account identifier, an account deletion request corresponding to the account identifier; retrieve, from the repository, an identifier of a printer associated with the account identifier; transmit, via the communications interface, a decommissioning command to the printer, the decommissioning command configuring the printer to delete data associated with the account identifier from a local storage of the printer; and delete, from the repository, the account identifier and account data associated with the account identifier.

FIG. 1 illustrates a system 100 for decommissioning cloud-connected printers and/or other cloud-connected peripheral devices, such as scanners, RFID encoders, home appliances, and the like. The system 100 includes a printer 104, which in the present example includes a label printer configured to apply indicia (e.g., via a thermal print head, although any of a variety of other impression technologies can be employed by the printer 104) to labels from a supply of labels. Processed labels can be dispensed from an outlet 108 of the printer 104. The printer 104 can also include an RFID encoder to encode and/or read RFID tags.

The printer 104 can be, for example, a label printer, configured to process labels with widths between about two inches and about four inches. The printer 104 can include or omit operator controls such as a keypad, a touch screen, or the like. When the printer 104 omits operator controls, the physical operator interface of the printer 104 can be limited to, for example, a power button 110. Control of the printer 104 can be effected by sending commands to the printer 104 from other computing devices via one or more networks. For example, the printer 104 can be connected to a wireless local area network (WLAN) 112, which can in turn be connected to a wide-area network or combination of networks 114. The printer 104 therefore includes a controller and a communications interface, e.g., to communicate with other devices for receipt of such commands, and to control the print head and other components of the printer 104 to act on the commands.

Commands for transmission to the printer 104 can be generated from a variety of computing devices. In the present example, commands are generated and transmitted by a print server 120, which can also be implemented as a subsystem including a set of interconnected servers connected to a wide-area network 116 (WAN), e.g., including a suitable combination of cellular networks and/or other data networks, including the Internet. The print server 120 can generate commands and transmit such commands to the printer 104 via interaction with a client computing device 124. The client device 124 is illustrated as being connected to the WLAN 112 in FIG. 1, but in other examples the client device 124 can instead be connected to the network 116 (e.g., via other wide-area networks, other local-area networks, or the like).

The client device 124 can be a smartphone, a tablet computer, a laptop computer, a desktop computer, a barcode scanner, or the like. The client device 124 can execute computer-readable instructions (e.g., included in an application such as a web browser and/or dedicated printer management application) to communicate with the print server 120, in response to which the server 120 can generate and transmit commands to the printer 104.

The system 100 can include other printers 104 beyond the single printer 104 shown in FIG. 1, and in some embodiments can include hundreds or thousands of printers 104.

The system 100 can also include other client devices 124, in addition to the example client device 124 shown in FIG. 1. Client devices 124 and printers 104 are associated with one another (e.g., one or more printers 104 with one or more client devices 124) by account identifiers maintained at the print cloud server 120. For example, a client device 124 can be associated with an account identifier via an account creation and/or authentication process, and a printer 104 can be provided with authentication and/or other data for local storage at the printer 104 via a provisioning process. When the printer 104 and the client device 124 are authenticated with the server 120 using the same account identifier, that client device 124 can initiate commands to that printer 104 via the server 120.

As shown in FIG. 1, each of the server 120, the printer 104, and the client device 124 store various information to associate the printer 104 with the client device 124 and facilitate the initiation of commands to the printer 104 by the client device 124 (via the server 120). For example, in the illustrated embodiment, the server 120 can maintain one or more repositories, including an account data repository 128 (e.g., implemented as one or more databases) that contains a plurality of account records. An example account record 132 is illustrated in FIG. 1, containing account data for an account via which the printer 104 and the client device 124 are associated. The repository 128 can also contain other account records, e.g., establishing associations between other printers and client devices.

The account records 132 contains, for example, an account identifier ("A123"), and a primary account identifier ("fg4987"). The account record 132 can also contain authentication data such as a password (e.g., "123456") and/or one or more encryption certificates (e.g., a certificate 136). The account record 132 can also contain identifiers (e.g., media access control (MAC) addresses, serial numbers, or the like) of any printers 104 and any client devices 124 associated with the account. More than one printer identifier, and/or more than one client device identifier, can be included in the account record 132 in other examples (e.g., if an operator of the printer 104 controls the printer 104 via a smartphone, as well as via a desktop computer using the same account credentials). The account record 132 can contain a variety of other information, such as names, mailing addresses, email addresses, billing information, and the like.

The print server 120 can also store a repository 140 containing historical data, such as records of past print jobs for each printer 104 in the system. The repository 140 is illustrated as containing records each including a primary account identifier and a print job identifier, but it is contemplated that the repository 140 can contain a wide variety of other information, including a time and date of a print job, printer and/or client device identifiers, print job data (e.g., images and/or text), and the like. As shown in FIG. 1, the repository 140 in this example does not contain account identifiers. Instead, the repository 140 contains primary account identifiers, while the repository 128 establishes associations between each primary account identifier and a corresponding account identifier.

The printer 104 stores, in a local storage element (e.g., a memory circuit or the like), data associated with the account identifier. The data stored at the printer 104 can include the account identifier itself, but can also, as illustrated, omit the account identifier. In the illustrated example, the printer 104 stores the primary account identifier, as well as the certificate 136 and network credentials for the WLAN 112 (e.g., a service set identifier (SSID) of the WLAN 112, and a password or other authentication data, not shown, for the WLAN 112). The printer 104 can also store saved print data, such as an image of the most recent print job executed at the printer 104, a location of the printer 104, e.g., as specified by a user, determined based on an Internet Protocol (IP) address (or portion thereof), and/or obtained by a location sensor of the printer 104 such as a global positioning system (GPS) sensor.

The client device 124 stores, e.g., in a memory circuit or the like, the account identifier and a password. In other examples, the client device 124 can store a further encryption certificate instead of or in addition to the password. In yet other examples, a user may be prompted by a web application and/or dedicated printer management application to provide the account identifier (or alias), password, and/or certificate to establish a connection between the client device 124 and the server 120, while requiring or not requiring the client device 124 to store the account identifier (or alias), password, and/or certificate. The connection established between the client device 124 and the server 120 can persist until one or more events occur (e.g., authorization credentials are revoked or become invalid, certificate expires or becomes invalid, the web application and/or print management application terminates, the client device or user of the client device terminates the connection, a decommissioning or de-authentication command is issued, etc.). The client device 124 can also store other account-related data, including any of the data discussed above in connection with the server 120 and the printer 104.

As will be apparent, each of the server 120, the printer 104, and the client device 124 store and/or have access to account-related data that may include sensitive data and/or personally identifiable information. Further, the provisioning process employed in the system 100 to associate the printer 104 with the account record 132 can prevent the printer 104 from being controlled from any client devices associated with other accounts. To facilitate releasing the printer 104 from association with an account record, while mitigating the risk of dissemination of sensitive data, the print server 120 can implement an account-deletion process, initiated at the client device 124, that removes account data from the repository 128, and also removes account data from local storage at the printer 104, releasing the printer 104 from the account association and facilitate re-provisioning of the printer 104 with a different account.

Figure 2:
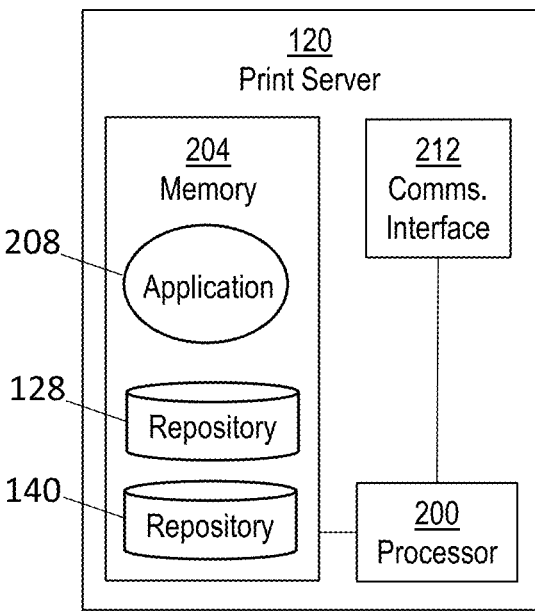
FIG. 2 is a diagram of certain internal components of the server of FIG. 1.

Turning to FIG. 2, certain internal components of the print server 120 are illustrated. As noted earlier, the server 120 can also be implemented as a subsystem of interconnected servers (e.g., each performing certain functions ascribed herein to the server 120). The server 120 can also, in some examples, be implemented in a distributed architecture, rather than the single-device architecture shown in FIG. 2.

In the illustrated example, the server 120 includes a processor 200 (e.g. a central processing unit (CPU)), interconnected with a non-transitory computer readable storage medium, such as a memory 204. The memory 204 includes a suitable combination of volatile memory (e.g., Random Access Memory or RAM) and/or non-volatile memory (e.g., read only memory or ROM, Electrically Erasable Programmable Read Only Memory or EEPROM, flash memory). The processor 200 and the memory 204 each comprise one or more integrated circuits. The memory 204 stores computer readable instructions executable by the processor 200 to perform various functionality related to the control and/or management of the printer 104 and account data. In particular, the memory 204 stores a decommissioning application 208 executable by the processor 200 to perform various actions discussed herein. The memory 204 also stores, in this example, the repositories 128 and 140 mentioned in connection with FIG. 1.

The server 120 also includes a communications interface 212 interconnected with the processor 200. The communications interface 212 includes suitable hardware (e.g. transmitters, receivers, network interface controllers and the like) allowing the server 120 to communicate with other computing devices—e.g., the printer 104 and the client device 124.

Figure 3:
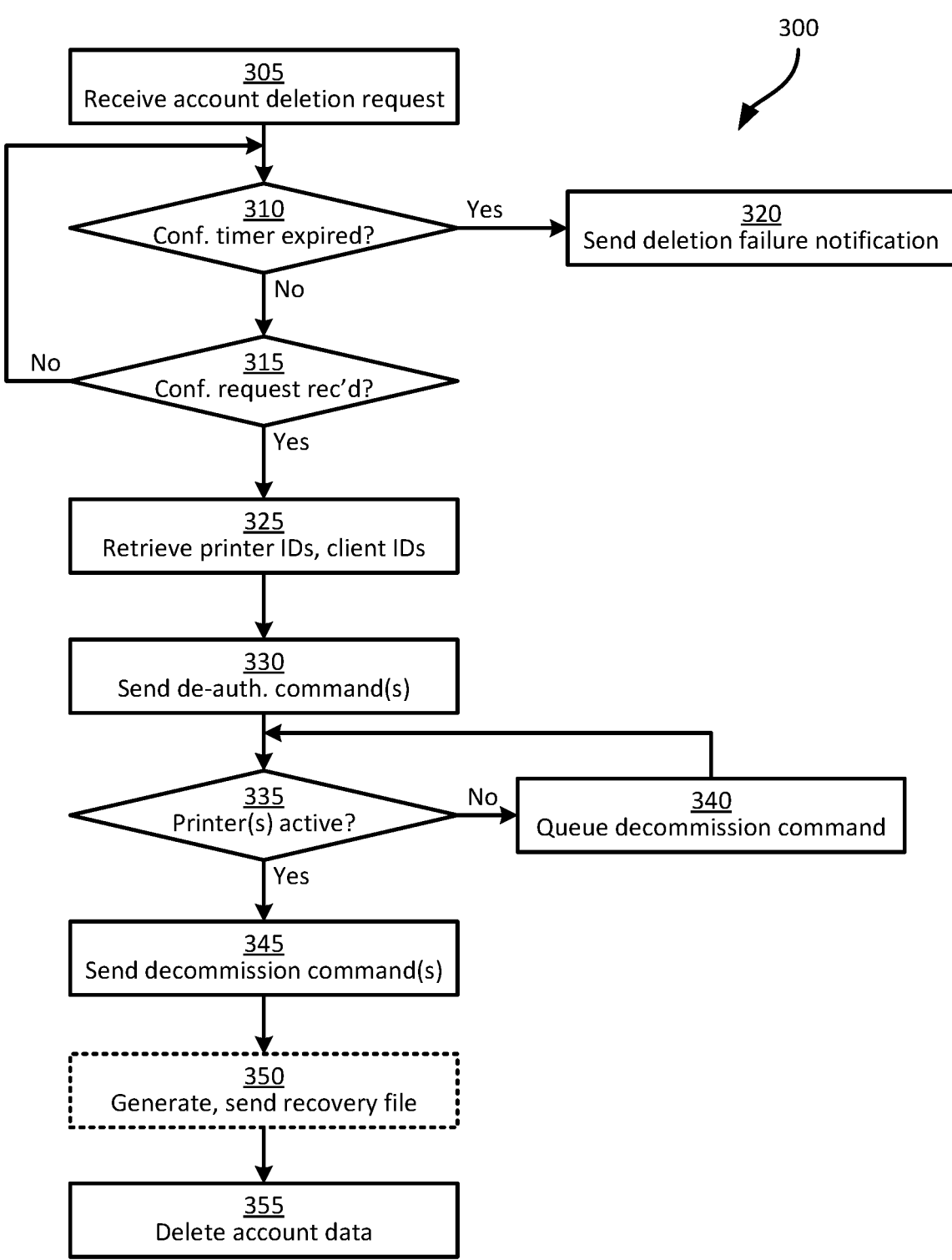
FIG. 3 is flowchart of a method for decommissioning printers.

Turning to FIG. 3, a method 300 of decommissioning printers is illustrated. The method 300 will be described in conjunction with its performance within the system 100, and in particular by the server 120, e.g., via execution of the application 208 by the processor 200.

At block 305, the server 120 is configured to receive an account deletion request from the client device 124. For example, the application executed at the client device 124 to interact with the server 120 to send commands such as print jobs to the printer 104 can include a selectable element for initiating the account deletion and decommissioning process. Selection of that element by an operator of the client device 124 causes the client device 124 to send an account deletion request to the server 120. The account deletion request corresponds to the account identifier "A123" shown in FIG. 1. The request can contain the account identifier explicitly in some examples. In other examples, the request need not contain the account identifier, because the client device 124 previously authenticated with the server 120 using the account identifier and is therefore associated with the account identifier at the server 120. In such examples, the identifier of the client device 124 itself (e.g., a MAC address or the like) is sufficient to associate the request with the relevant account identifier.

At block 310, the server 120 can initiate a confirmation process before proceeding with account deletion, e.g., to mitigate accidental account deletions by authorized users and/or to mitigate malicious account deletions by unauthorized users of the client device 124. For example, in response to receiving the account deletion request at block 305, the server 120 can initiate a confirmation timer (e.g., one hour, although shorter or longer time periods can also be employed in other embodiments). When the confirmation timer expires without receipt of an account deletion confirmation request from the client device 124, the account deletion process is terminated (that is, no account data is deleted, and the printer 104 is not decommissioned).

At block 310, the server 120 is configured to determine whether the confirmation timer has expired. When the confirmation timer has not yet expired, the server 120 is configured to determine, at block 315, whether an account deletion confirmation request has been received from the client device 124. The confirmation request can be generated by the client device 124, for example in response to a re-authentication (e.g., re-entry of the account identifier and password or other credentials) at the client device 124, followed by selection of a confirmation element presented at the client device 124.

Figure 4:
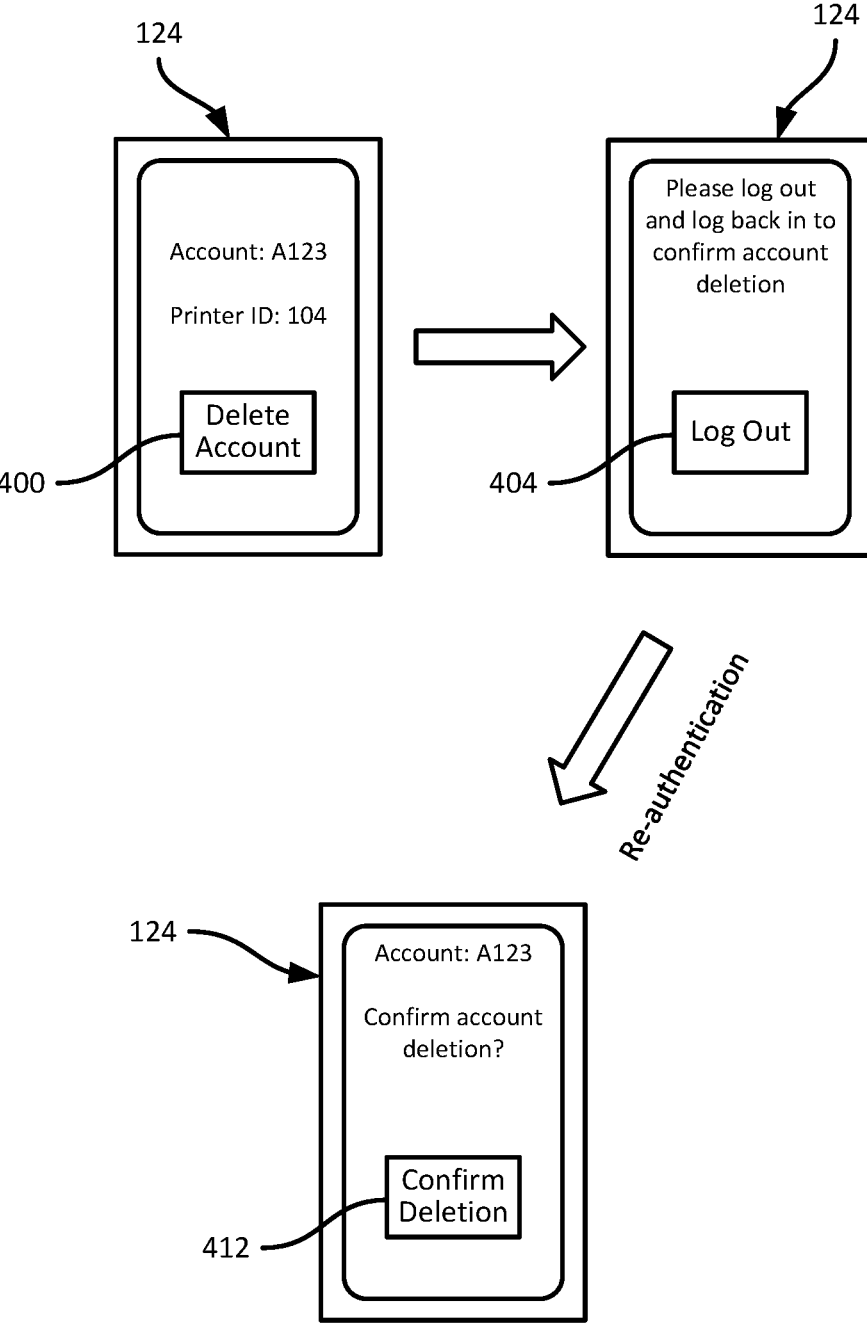
FIG. 4 is a diagram illustrating example graphical user interfaces at a client device of the system of FIG. 1 during a performance of blocks 305, 310, and 315 of the method of FIG. 3.

Turning to FIG. 4, example graphical user interfaces presented at the client device 124 to initiate an account deletion request, and a confirmation request, are illustrated. For example, selection of an account deletion element 400 presented on a display of the client device 124 can cause the client device 124 to present a prompt to log out of the relevant account, re-authenticate and confirm the account deletion request, along with a selectable element 404 to log out. Selection of the element 404 can trigger a re-authentication process, e.g., including a prompt on the display for an account identifier and password or other credentials (not shown). Following successful re-authentication, the client device 124 can present a prompt to confirm the previous account deletion request, e.g., by selecting a confirmation element 412.

Returning to FIG. 3, when the determination at block 315 is negative, the server 120 is configured to continue monitoring for the receipt of an account deletion confirmation request corresponding to the same account identifier as the account identifier associated with the request from block 305. If the determination at block 310 is negative before a confirmation request is received, the server 120 terminates performance of the method 300 at block 320. The server 120 can, for example, send a failure notification to the client device 124, indicating that the attempt to delete the account was unsuccessful.

When the determination at block 315 is affirmative, indicating that the server 120 received a confirmation request prior to expiry of the confirmation time period, the server 120 proceeds to block 325. In other examples, blocks 310, 315, and 320 can be omitted, and the server 120 can proceed directly to block 325 in response to receipt of an account deletion request.

While the method 300 illustrates an example confirmation process, embodiments of the present disclosure can include additional or alternative confirmation processes. As an example, upon receipt of an account deletion request, the server 120 may transmit an email to an email address associated with the account with a selectable link to submit the account deletion confirmation request, transmit a text message to a phone number associated with the account with a selectable link to submit the account deletion confirmation request, require the user to submit the with a selectable link to submit the account deletion confirmation request through another client device, and/or actuate a control on the printer in a prescribed manner (e.g., depress the power button for a specified amount of time or until an operation is activated by the printer 104.

At block 325, the server 120 begins the account deletion and printer decommissioning process by retrieving identifiers of any printers associated with the account deletion request from block 305, as well as any client devices 124 associated with the account deletion request (e.g., including client devices 124 beyond the client device 124 from which the request at block 305 was received). In the present example, as shown in FIG. 1, the account identifier A123 is associated with the client device 124 and the printer 104, and identifiers of the printer 104 and client device 124 are therefore retrieved at block 325. The identifiers retrieved at block 325 can be retrieved from the repository 128, and can include MAC addresses, IP addresses, serial numbers, or the like (including combinations thereof). The identifiers retrieved by the server 120 at block 325 serve to facilitate communication with the corresponding client devices 124 and printers 104.

At block 330, the server 120 is configured to send de-authentication commands to any client devices whose identifiers were retrieved at block 325. In the present example, therefore, the server 120 is configured to send a de-authentication command to the client device 124. When more than one client device 124 is associated with a given account, each associated client device 124 is sent a de-authentication command. The de-authentication command can be processed at the client device 124 via execution of the previously mentioned application, to log out of the relevant account, and to discard any locally stored authentication data for the account, such as the account identifier and password, and/or other account data including personal identifiable information and other user data.

The server 120 is also configured to send respective decommissioning commands to each printer 104 whose identifier was retrieved at block 325. In the present example therefore, the server 120 is configured to send a decommissioning command to the printer 104. The decommissioning command configures the printer 104 to delete data associated with the account identifier from local storage of the printer 104, to delete other account data including personal identifiable information and other user data, and/or to delete printer configuration settings stored in the printer.

At block 335, the server 120 is configured to determine whether the printer(s) identified at block 325 are currently active. A printer 104 is considered active if the printer 104 has established a communications link with the server 120 that is currently active. The repository 128, for example, can contain connection data indicating the current connection status of the printer, including an IP address for the printer 104. When the determination at block 335 is negative (e.g., because the printer 104 is not connected to the network), at block 340 the server 120 is configured to generate a queue for the decommissioning command, e.g., by storing the decommissioning command in a queue in the memory 204. The server 120 can then repeat the determination at block 335 periodically (e.g., every ten minutes, although both shorter and longer periods can also be employed).

The server 120 can operate to check the decommissioning queue when the printer 104 attempts to re-connect to the server 120, and in some examples, can transmit the decommission command to the printer 104 in response to a connection request from the printer 104. The decommissioning queue can include, for example, the identifier for the printer (e.g., a MAC address or other device identifier) that can be compared to the identifier included in the connection request and can exclude any account information, such as the account identifier, the primary account identifier, passwords, certificates, client identifiers, and the like. A printer may be disconnected from the server 120 for any amount of time (e.g., one or more minutes, hours, days, months, or years) after the account deletion account deletion and printer decommissioning process begins. As such, the decommissioning queue can allow the account deletion and printer decommissioning process proceed for the account for other printers and client devices. Thus, in some examples, the account deletion and printer decommissioning process can be completed with the exception of decommissioning any printers that were not connected to the server 120 and added to the decommissioning queue. Any association of the printer in the decommissioning queue to the account that was deleted can also be deleted. Using this approach can allow the system to ensure that any account data, user data, and/or personal identifiable information can be deleted while one or more printers in the decommissioning queue are disassociated with the account and await decommissioning.

Figure 5:
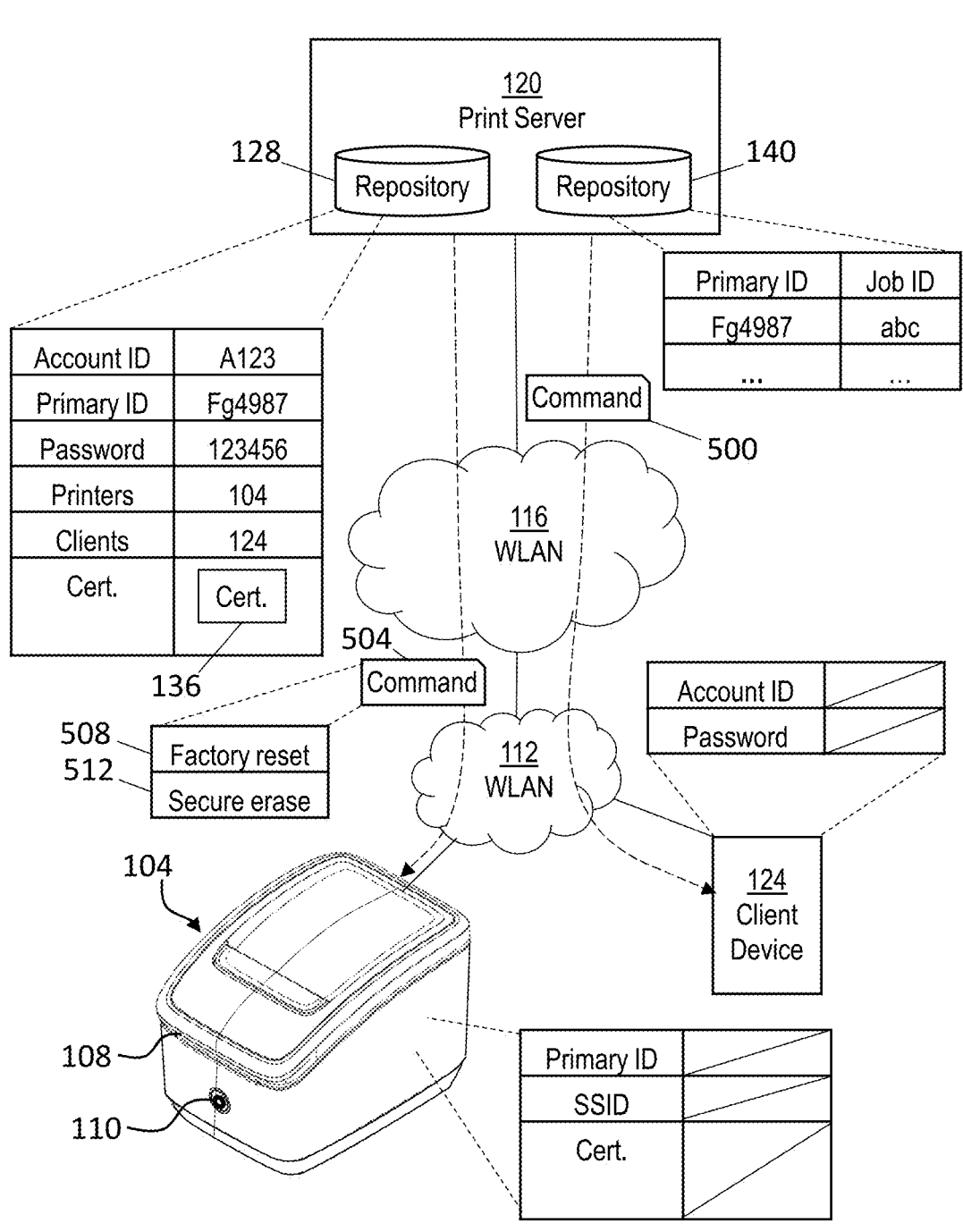
FIG. 5 is a diagram illustrating an example performance of blocks 330 and 345 of the method of FIG. 3.

When the determination at block 335 is affirmative, the server 120 is configured to transmit the decommissioning command to the printer 104 at block 345. Turning to FIG. 5, an example de-authentication command 500 is shown transmitted by the server 120 to the client device 124 (at block 330), and an example decommissioning command 504 is shown transmitted to the printer 104 (at block 345). The server 120 can perform blocks 330 and 345 in the order shown in FIG. 3, or in the opposite order. In further examples, the server 120 can perform blocks 330 and 345 substantially in parallel.

The de-authentication command 500 causes the client device 124 to log out and delete any locally stored authentication data, as shown in FIG. 5. The decommissioning command 504 can include, for example, a decommissioning parameter 508 that causes the printer 104 to perform a factory reset operation. The factory reset operation includes the deletion of any locally-stored account data, e.g., including any or all of the account identifier, the primary account identifier, wireless network credentials, encryption certificates, saved print data (e.g., the most recent print job), location data, printer configuration data, or the like. In some implementations, the printer 104 can implement distinct factory reset and decommissioning operations. For example, a factory reset operations in some implementations may preserve account data and/or recent print job data, while resetting other configuration data (e.g., network configuration) to factory defaults. In such implementations, a decommissioning operation can include the actions taken in the factory reset operation, as well as the deletion of account data, recent print job data, and the like. In such implementations, the command 504 can cause the printer 104 to perform a decommissioning operation.

In some examples, the command 504 also includes a secure erase parameter 512, e.g., configuring the printer to initiate a secure erasure operation for local storage. The secure erasure operation can include overwriting local storage at the printer 104 with a sequence of random bits, multiple sequences of ones and/or zeroes, deleting encryption keys employed to encrypt and decrypt locally stored data, or the like.

Following transmission of the commands 500 and 504, and execution of the commands 500 and 504 by the client device 124 and the printer 104 respectively, no account data remains in local storage at the client device 124 and the printer 104, as shown in FIG. 5. In response to execution of the factory reset, the printer 104 is rendered non-functional (e.g., unable to execute print operations). That is, the printer 104 can only be controlled to execute further printing activities after being registered to another account and re-provisioned.

Returning to FIG. 3, at block 350, the server 120, in some embodiments, can generate a recovery file containing at least the account identifier and primary account identifier. In some examples, the recovery file can include provisioning data for the printer 104, such as the certificate 136, authentication credentials for the WLAN 112, and the like. The recovery file can be encrypted, e.g., by prompting the client device 124 for an encryption key which is not stored persistently at the server 120, but discarded after generation of the recovery file at block 350. The encrypted recovery file can be sent to the client device 124 for storage. When block 350 is implemented, the account deletion may therefore be reversed later, e.g., by decrypting the file at the client device 124 and sending an account re-creation request to the server 120. In other examples, however, the performance of block 350 can be omitted such that the method proceeds from block 345 to block 355 without performing the operations associated with block 350.

Figure 6:
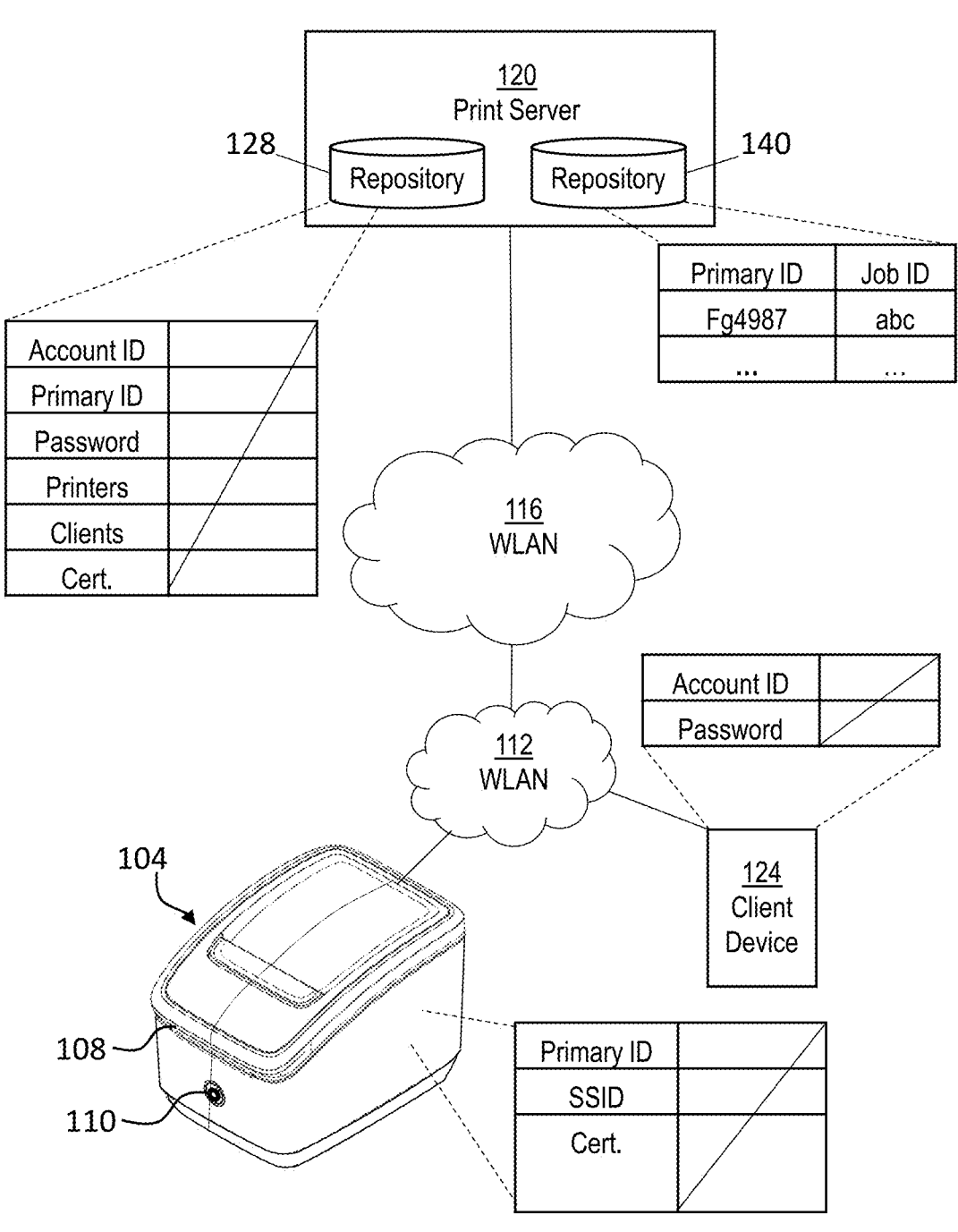
FIG. 6 is a diagram illustrating an example performance of block 355 of the method of FIG. 3.

At block 355, the server 120 is configured to delete the account identifier and account data associated with the account identifier. As shown in FIG. 6, for example, the contents of the record 132 can be deleted, such that the association between the account identifier and the primary account identifier is deleted, as well as the remaining account data in the record 132 (e.g., authentication data, billing information, and the like). The record 132 may be deleted in its entirety, in some examples. As seen in FIG. 6, in some examples the historical data associated with the primary account identifier ("fg4987") may be retained. The historical data is substantially anonymized by deletion of the association between the primary account identifier and the account identifier. In other examples, however, any historical data associated with the primary account identifier can also be deleted from the repository 140.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a server, the method comprising:

communicatively coupling a client computing device to a printer via a server based on an association of the client computing device and the printer with an account identifier, the server controls print operations of the printer in response to instructions received from the client computing device;

receiving, from the client computing device associated with the account identifier, an account deletion request corresponding to the account identifier;

retrieving, from a repository, an identifier of the printer associated with the account identifier;

receiving confirmation of the account deletion request from the client computing device;

determining that the printer is not connected to the server in response to the account deletion request;

queueing a decommissioning command in a queue in response to determining that the printer is not connected to the server;

receiving, from the printer, an attempt to re-connect to the server;

checking the queue for the decommissioning command for the printer;

transmitting the decommissioning command to the printer corresponding to the identifier of the printer and transmitting a de-authentication command to the client computing device;

decommissioning the printer via the decommissioning command in response to receiving confirmation of the account deletion request and receiving the attempt to re-connect to the server, the decommissioning command causing the printer to delete data associated with the account identifier from a local storage of the printer, the decommissioning command terminating a communication connection between the server and the printer and renders the printer inoperable for printing;

de-authenticating the client computing device via the de-authentication command in response to receiving confirmation of the account deletion request, the de-authentication command causing the client computing device to delete locally stored authentication data including the account identifier and prevents the client computing device from re-connecting to the server with the locally stored authentication data; and deleting, from the repository, the account identifier and account data associated with the account identifier.

2. The method of claim 1, further comprising, prior to retrieving the identifier of the printer:

in response to receiving the account deletion request, initiating a confirmation timer at the server; and receiving an account deletion confirmation request from the client computing device before expiry of the confirmation timer.

3. The method of claim 2, further comprising:

receiving, from the client computing device, (i) a re-authentication request, and (ii) the account deletion confirmation request, before expiry of the confirmation timer.

4. The method of claim 1, further comprising:

storing, in the repository, (i) historical data corresponding to the printer in association with a primary account identifier, and (ii) an association between the primary account identifier and the account identifier; wherein deleting the account data includes deleting the association between the primary account identifier and the account identifier.

5. The method of claim 4, wherein the data associated with the account identifier stored in the local storage of the printer includes at least one of:

the account identifier, the primary account identifier, wireless network credentials, an encryption certificate, saved print data, or a stored location of the printer.

6. The method of claim 4, further comprising:

generating an encrypted recovery file containing the account identifier and the primary account identifier; and transmitting the encrypted recovery file to the client computing device.

7. The method of claim 1, further comprising:

retrieving, from the repository, respective identifiers of a plurality of printers associated with the account identifier; and transmitting respective decommissioning commands to each of the plurality of printers.

8. The method of claim 1, further comprising:

retrieving, from the repository, an identifier of a second client computing device associated with the account identifier; and transmitting, to the second client computing device, a de-authentication command.

9. The method of claim 1, wherein the decommissioning command includes a secure erase parameter.

10. The method of claim 1, wherein a printing operation of the printer is rendered non-functional in response to the decommissioning command.

11. A server, comprising:

a memory storing a repository;

a communications interface; and a processor configured to:

communicatively couple a client computing device to a printer via a server based on an association of the client computing device and the printer with an account identifier, the server controls print operations of the printer in response to instructions received from the client computing device;

receive, from the client computing device associated with the account identifier, an account deletion request corresponding the account identifier;

retrieve, from the repository, an identifier of the printer associated with the account identifier;

receiving confirmation of the account deletion request from the client computing device;

determining that the printer is not connected to the server in response to the account deletion request;

queueing a decommissioning command in a queue in response to determining that the printer is not connected to the server;

receiving, from the printer, an attempt to re-connect to the server;

checking the queue for the decommissioning command for the printer;

transmitting the decommissioning command to the printer corresponding to the identifier of the printer and transmitting a de-authentication command to the client computing device;

decommissioning the printer via the decommissioning command in response to confirmation of the account deletion request receiving confirmation of the account deletion request and receiving the attempt to re-connect to the server, the decommissioning command causing the printer to delete data associated with the account identifier from a local storage of the printer, the decommissioning command terminating a communication connection between the server and the printer and renders the printer inoperable for printing;

de-authenticate the client computing device via the de-authentication command in response to receiving confirmation of the account deletion request, the de-authentication command causing the client computing device to delete locally stored authentication data including the account identifier and prevents the client computing device from re-connecting to the server with the locally stored authentication data; and delete, from the repository, the account identifier and account data associated with the account identifier.

12. The server of claim 11, wherein the processor is further configured, prior to retrieving the identifier of the printer, to:

in response to receiving the account deletion request, initiate a confirmation timer at the server; and receive an account deletion confirmation request from the client computing device before expiry of the confirmation timer.

13. The server of claim 12, wherein the processor is further configured to:

receive, from the client computing device, (i) a re-authentication request, and (ii) the account deletion confirmation request, before expiry of the confirmation timer.

14. The server of claim 11, wherein the repository contains (i) historical data corresponding to the printer in association with a primary account identifier, and (ii) an association between the primary account identifier and the account identifier; and wherein the processor is further configured to delete the account data by deleting the association between the primary account identifier and the account identifier.

15. The server of claim 14, wherein the data associated with the account identifier stored in the local storage of the printer includes at least one of:

the account identifier, the primary account identifier, wireless network credentials, an encryption certificate, saved print data, or a stored location of the printer.

16. The server of claim 14, wherein the processor is further configured:

generate an encrypted recovery file containing the account identifier and the primary account identifier; and transmit the encrypted recovery file to the client computing device.

17. The server of claim 11, wherein the processor is further configured to:

retrieve, from the repository, respective identifiers of a plurality of printers associated with the account identifier; and transmit respective decommissioning commands to each of the plurality of printers.

18. The server of claim 11, wherein the processor is further configured:

retrieve, from the repository, an identifier of a second client computing device associated with the account identifier; and transmit, to the second client computing device, a de-authentication command.

19. The server of claim 11, wherein the decommissioning command includes a secure erase parameter.

20. The server of claim 11, wherein a printing operation of the printer is rendered non-functional in response to the decommissioning command.

* * * * *